United States Patent [19]

Bohusch et al.

[11] 4,094,553
[45] June 13, 1978

[54] BRAKE CONTROL SYSTEM HAVING AN ELECTRO-PNEUMATIC PILOT VALVE

[75] Inventors: Glen O. Bohusch; Walter E. Rojecki, both of Watertown, N.Y.

[73] Assignee: General Signal Corporation, Rochester, N.Y.

[21] Appl. No.: 819,907

[22] Filed: Jul. 28, 1977

[51] Int. Cl.² ............................................. B60T 7/12
[52] U.S. Cl. ...................................................... 303/3
[58] Field of Search .............................. 303/3, 15-16, 303/40, 60, 68, 69, 100, 115, 117, 118, 119

[56] References Cited

U.S. PATENT DOCUMENTS

| | | | |
|---|---|---|---|
| 3,275,380 | 9/1966 | May | 303/3 |
| 3,536,360 | 10/1970 | Engle | 303/3 |
| 3,536,361 | 10/1970 | Engle | 303/3 |
| 3,814,483 | 6/1974 | Coiner et al. | 303/3 |
| 3,857,614 | 12/1974 | Kurichh | 303/118 |
| 3,880,476 | 4/1975 | Belart et al. | 303/119 |
| 3,924,902 | 12/1975 | Engle | 303/100 |
| 4,021,079 | 5/1977 | Bohusch | 303/3 |

*Primary Examiner*—Stephen G. Kunin
*Attorney, Agent, or Firm*—Harold S. Wynn

[57] ABSTRACT

An electro-pneumatic pilot valve device is operably connected to a relay valve device for governing fluid pressure control of friction brakes of a vehicle in accordance with at least one variable analog signal input to the pilot valve device. The electro-pneumatic pilot valve device has a differential piston assembly comprising a valve plunger having ball valves disposed coaxially thereon and input, vent, and pilot chambers associated with the valves wherein one of the valves selectively connects the input chamber to the pilot chamber, and another valve selectively connects the pilot chamber to the vent chamber. A linear torque motor is governed by a variable input electrical signal for selectively applying a force axially to the plunger to vent fluid from the pilot chamber to atmosphere through the vent chamber. A balance of forces acting on the plunger permits operation of the valves to a lap position.

8 Claims, 1 Drawing Figure

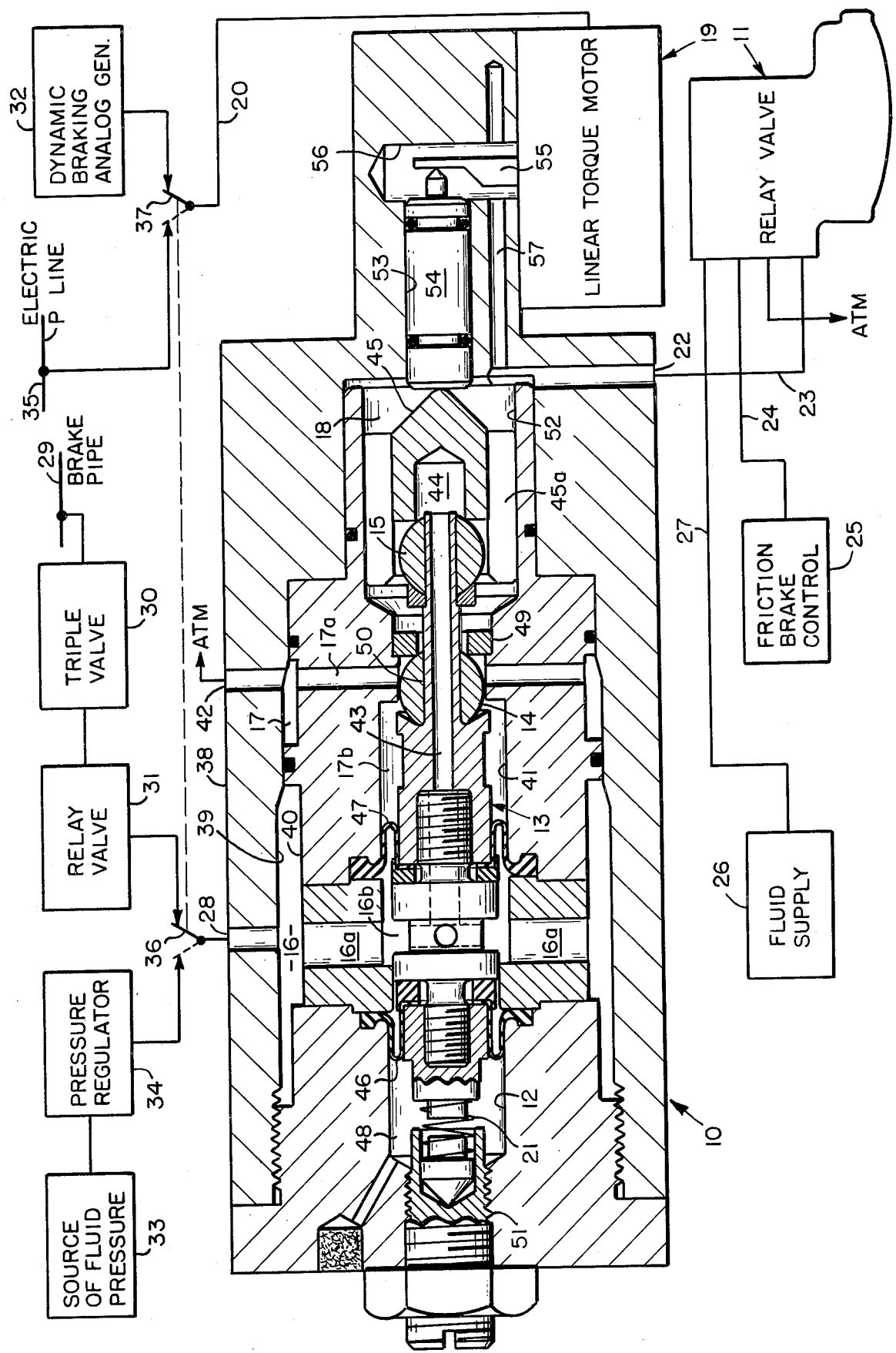

BRAKE CONTROL SYSTEM HAVING AN ELECTRO-PNEUMATIC PILOT VALVE

BACKGROUND OF THE INVENTION

This invention relates to brake control systems for governing field pressure control of friction brakes of a vehicle, and while the invention is subject to a wide range of applications, a preferred embodiment of the invention will be particularly described as applied to a fluid brake control system having an improved electro-pneumatic pilot valve device.

It is general practice in controlling brakes of electrically propelled rapid transit cars, light rail vehicles, and the like, to govern braking on each car in accordance with an analog signal indicative of total braking requirements. This can be a variable fluid pressure signal or a variable electrical signal in accordance with the type of braking system employed. Such an analog signal may be indicative of total braking requirements to be provided for the vehicle, in part by dynamic braking, and in part by fluid actuated friction brakes. An electro-pneumatic pilot valve device is used to generate a pilot signal indicative of the extent of friction braking that is required to supplement the dynamic braking. This pilot signal is generally used to govern the friction brakes through a suitable relay valve device. Electropneumatic pilot valve devices for performing this function are disclosed in the prior Engle U.S. Pat. Nos. 3,536,360, 3,536,361 and 3,924,902, and in the Bohusch U.S. Pat. No. 4,021,079, all of which are assigned to the assignee of this application. These patents are incorporated herein by reference to an extent necessary to disclose prior art details that may be considered essential for an understanding of the present invention.

The systems according to the above patents, when used for blending purposes, require an electrical torque motor, a pneumatic torque motor, a comparator shaft for comparing outputs of both torque motors, a pilot valve assembly driven by rotation of the comparator shaft, and a main valve assembly governed by the pilot valve assembly. These patents teach that different types of electro-pneumatic pilot valve devices must be used in accordance with whether the analog brake control signal input to the device is a variable fluid pressure signal or a variable electrical signal.

An object of the present invention is to provide a brake control system which substantially obviates one or more of the limitations and disadvantages of the described prior systems.

Another object of the present invention is to provide in improved electro-pneumatic pilot valve device that is universal in its application in that it can be used without modification in response to either an analog fluid braking signal input or an analog electrical signal input, either signal being indicative of total braking requirements.

Another object of the present invention is to provide an improved, simplified and less expensive electro-pneumatic pilot valve device.

Other objects, purposes and characteristic features of the present invention will be in part obvious from the accompanying drawing and in part pointed out as the description of the invention progresses.

SUMMARY OF THE INVENTION

A brake control system is provided for governing fluid pressure control of friction brakes of a vehicle, the brake control system having an electro-pneumatic pilot valve device operably connected to a relay valve device for governing fluid pressure control of the friction brakes of the vehicle in accordance with at least one variable analog signal input to the pilot valve device. An improved electro-pneumatic pilot valve device is provided having a valve plunger with valves disposed thereon for governing development of a pilot fluid pressure control signal. Input, vent, and pilot chambers are associated with the valves of the plunger for at times charging the pilot chamber from the input chamber through one of the valves, and at other times reducing the pilot pressure through another one of the valves and the vent chamber.

A linear torque motor is arranged to be responsive to a variable input electrical signal for applying a force axially to the plunger in a direction to open the valve associated with the vent chamber for reducing pressure in the pilot chamber in accordance with an increase in magnitude of an electrical signal input to the torque motor.

A self-lapping feature is provided by an organization for governing axial movement of the plunger to lap the valves in accordance with a combination of an axial force on the plunger in one direction developed by the torque motor and an axial force on the plunger in the same direction generated by pressure in the pilot chamber, substantially balancing an opposing axial force on the plunger generated by differential pressure in the input chamber.

For a better understanding of the present invention, together with other and further objects thereof, reference is had to the following description taken in connection with the accompanying drawing, while its scope will be pointed out in the appending claims.

The accompanying drawing is an elevational view shown partly in cross section and partly by block diagram, of two brake control systems using a universal electro-pneumatic pilot valve device according to a preferred embodiment of the present invention.

With reference to the drawing, the brake control system comprises an electro-pneumatic pilot valve device 10 that is operably connected to a relay valve device 11.

The electro-pneumatic pilot valve device 10 has a bore 12, in which is inserted a valve plunger 13 which has secured thereon valves 14 and 15 for governing development of a pilot fluid pressure control signal.

Input, vent, and pilot chambers 16, 17, and 18 respectively are associated with the valves 14 and 15 of the plunger 13 for at times charging the pilot chamber 18 from the input chamber 16 through valve 15 and at other times reducing the pilot pressure in chamber 18, through valve 14, to vent chamber 17 to atmosphere.

A linear torque motor 19 is governed by a variable electrical input signal over line 20 for applying a force axially to the left against the plunger 13 to open valve 14 for reducing pressure in the pilot chamber 18 in accordance with an increase in magnitude of the electrical signal input to the torque motor 19 over line 20.

The valves 14 and 15 are self-lapping in that they become closed by a light spring bias to the right provided by spring 21 when the sum of the force generated axially to the left against the plunger 13 by the linear torque motor 19 and a force applied to the plunger 13 by pressure in the pilot chamber 18 substantially equals a force generated in input chamber 16 tending to move the plunger 13 to the right. Fluid pressure in pilot chamber 18 is applied through a pilot port 22 over line 23 as an input to relay valve device 11. Relay valve device 11, in turn, generates a corresponding signal output over line 24 to friction braking control apparatus 25, fluid for this control being supplied by a suitable fluid supply 26 over line 27. The operation of the relay valve devices 11 can be, for example, comparable to the operation of relay valve 9 of FIG. 2 in the above mentioned Engle U.S. Pat. No. 3,924,902.

The improved electro-pneumatic pilot valve device 10 is operable without requiring modification, either as a blending valve device in response to a variable fluid input to the input chamber 16 at input port 28 indicative of a desired degree of braking, as determined by sensing a change in pressure in a brake pipe 29 by a conventional triple valve 30 and relay valve device 31 and an electrical input to the torque motor 19 indicative of the degree of dynamic braking from a dynamic braking analog generator 32; or, as a control valve device in response to a constant pressure input applied from a suitable source of fluid pressure 33 through a pressure regulator 34 to the input port 28, and an electrical input to the torque motor 19 over line 20 in accordance with an electrical analog signal applied to a P-line 35. A valve 36 and a switch 37 are schematically illustrated for the purpose of understanding the manner in which the electro-pneumatic pilot valve device 10 can, without modification, be used in two different types of braking systems. With valves 36 and switch 37 in their right-hand positions, the electro-pneumatic pilot valve device 10 is used as a blending valve device, while, if the valve 36 and the switch 37 are in their lefthand positions, the electro-pneumatic pilot valve device 10 is operable as a control valve device. The valve 36 and the switch 37 would not be provided in practice, however, because only one of the alternate systems illustrated would be used on any one car with which the improved electro-pneumatic pilot valve device 10 would be associated.

Having thus considered the basic operation of an electro-pneumatic pilot valve device according to a preferred embodiment of the present invention for use both as a blending valve device and a control valve device, consideration will now be given as to the specific structure of the pilot valve device 10. The pilot valve device 10 has a manifold housing 38 having a stepped bore 39 formed therein for receiving a stepped cylindrical manifold 40, which in turn has a stepped bore 41 for receiving the plunger 13 carrying its ball valves 14 and 15 thereon. The manifold 40 is threaded into manifold housing 38 and has respective input and pilot chambers 16 and 17 respectively formed therein by peripheral recesses, the chamber 16 being connected to input port 28, and the chamber 17 being connected to atmosphere through port 42. The input chamber 16 is connected by a plurality of radial passages 16a to an axial passage 43 in the plunger 13, which extends to the right into a chamber 44 in a movable seat 45, and from the valve 15, to pilot chamber 18. Similarly, the vent chamber 17 has radial passages 17a connected to a second vent manifold chamber 17b at the outer periphery of vent valve 14 and surrounding a portion of the plunger 13.

The input chamber 16 comprises an inner pressure chamber 16b, the opposite sides of which are terminated by diaphragms 46 and 47, the right-hand diaphragm 47 having a slightly larger area exposed to the pressure in chamber 16b than the diaphragm 46 to provide a resultant differential force to the right on the plunger 13. The diaphragms 46 and 47 are secured in the manifold 40 and in the plunger 13 by a suitable sandwich type structure, with slack in the diaphragms, to permit the plunger 13 to move freely relative to the manifold 40 in response to axial forces applied thereto. Chambers 48 and 17b on the left and right hand sides of diaphragms 46 and 47 respectively are both continuously vented to atmosphere. Valve 15 is biased to the left by fluid pressure in chamber 18 effective on the right-hand end of seat 45 to an extent governed by the diameter of chamber 44.

Valve 14 closes in response to an axial force to the right on plunger 13 against a fixed seat 49, the seat 49 having a bore sufficiently greater than the diameter of spindle 50 of plunger 13 to permit a differential force to the left to be generated against valve 14 by pressure of fluid in the pilot chamber 18, and thus against the plunger 13, over an area of valve 14 comparable to the differential area of the diaphragms 46 and 47. When the opposing forces on plunger 13, generated in chambers 16 and 18 respectively, are substantially in balance, the light bias of spring 21 is sufficient to close valve 14 against its seat 49. The pressure of spring 21 is adjustable by a screw 51, threaded into the left-hand end of manifold 40.

The valve seat 45 is slideable in a bore 52 in manifold 40, the seat 45 having a slotted periphery 45a for permitting free passage of fluid from passage 43 through chamber 44 in the seat 45 to the pilot chamber 18, and thus to relay valve device 11, when valve 15 is open.

The right-hand end of the manifold housing 38 has a bore 53 provided therein for receiving a damping piston 54, coaxial with the plunger 13, and disposed between an actuator 55 of the linear torque motor 19 and the movable valve seat 45 so as to apply an axial force to the left against the movable valve seat 45 proportional to the degree of energization of the torque motor 19. The actuator 55 is moved angularly within a bore 56 in the manifold housing 38. A bore 57 connects the bore 56 with the pilot chamber 18 to provide that the damping piston 54 is balanced relative to fluid pressures in the pilot chamber 18.

The mode of operation of the universal electropneumatic pilot valve device 10 will first be considered under typical conditions when this device is used in a braking system as a blending valve device in combination with relay valve device 11. Under normal conditions, with the brakes of the vehicle released, all three chambers 16, 17 and 18 are at atmospheric pressure. In response to a reduction in pressure in the brake pipe 29 indicative of a service brake application, for example, the triple valve 30 senses the extent of reduction, and the relay valve device 31 delivers an output pressure (typically 2.5 times the pressure reduction in the brake pipe 29) to the input port 28 indicative of the desired total braking effort for the vehicle. Also, in accordance with the designated brake application, the control of the traction motors (not shown) is shifted first to a coasting condition and then to apply dynamic braking, and an electrical signal is generated in dynamic braking analog generator 32 indicative of the degree of dynamic braking provided. Thus, output of dynamic braking analog generator 32 is applied over line 20 to linear torque motor 19, and the actuator 55 is moved angularly to the left with a force directly proportional to the degree of dynamic braking that is being provided for blending the dynamic and friction braking.

As pressure is built up in the input chamber 16, fluid flows through axial passage 43 of the plunger 13 to chamber 44 in the movable seat 45 to cause this seat to be moved to the right against the force of the actuator 55 of the linear torque motor 19 to permit fluid to flow into the pilot pressure chamber 18, and thus through output port 22 and passage 23 to the pilot chamber of relay valve device 11. Fluid flows through valve 15 until valve 15 becomes closed when the force applied to the left to movable seat 45 jointly by the linear torque motor 19 and by pressure in the pilot chamber 18 substantially equals the force to the right applied in chamber 44 by fluid pressure in input chamber 16, passage 43, and chamber 44.

As the speed of the vehicle is reduced, the signal generated by dynamic braking analog generator 32 becomes reduced, and thus less force is exerted against the movable seat 45 by the actuator 55 of the torque motor 19. In accordance with this reduction, pressure in chamber 44 at the right of valve 15 opens valve 15 to permit fluid to flow into pilot chamber 18 to raise the pressure in pilot chamber 18 to provide additional friction braking to compensate for the smaller percentage of the braking effort being provided by the dynamic brakes of the vehicle. Thus, the increased pressure in pilot chamber 18 causes an increase in pressure in the pilot chamber of the relay valve device 11 to provide for increased friction braking. When dynamic braking is no longer effective, the valve 15 remains open to cause the pilot chamber 18 to assume the same pressure as the input chamber 16 to cause the friction brake control 25 to exert friction braking to an extent directly corresponding to the pressure at the input 28 of the electro-pneumatic pilot valve device 10.

As an operator of a train changes the degree of braking designation, when the universal electro-pneumatic valve is used as a blending valve device, fluid pressure input at input port 28 is varied accordingly. An increase in fluid pressure in input chamber 16 causes valve 15 to pass fluid to pilot chamber 18 to restore a balance in forces and a decrease in fluid pressure in input chamber 16 causes vent valve 14 to open to vent fluid from pilot chamber 18 to restore a balance in forces. Valve 14 is opened at this time because the total force on that valve 14 from pilot chamber 18 and the torque motor output is greater than the reduced opposing force on plunger 13 exerted as a result of differential forces on the diaphragms 46 and 47, which has been reduced due to the reduction of input fluid pressure at port 28.

When release of the brakes is designated by the operator, chamber 16 is vented through relay valve device 31 and pressure in pilot chamber 18 is vented through vent valve 14. This also causes the venting of fluid in relay valve device 11 to permit release of the friction brake by friction brake control apparatus 25.

Considering the electro-pneumatic pilot valve device 10 as used in the braking system where the degree of braking is determined by an electrical P-line, such as the electrical P-line 35 illustrated in the drawing, the signal applied to linear torque motor 19 from P-line 35 varies inversely with the degree of braking required. Fluid pressure applied at the input 28 to the electro-pneumatic pilot valve device 10, however, is at a constant pressure as determined by the pressure regulator 34 acting on an input from the source of fluid pressure 33. The pressure output of regulator 34 corresponds to the maximum pressure output that would be desired from the one to one ratio relay valve device 11 if the signal of the P-line 35 were reduced to zero. Under this condition, the valve 15 is maintained open so that the pilot chamber 18 assumes the same pressure as the input chamber 16.

The pilot chamber 18, and thus the pilot chamber (not shown) of relay valve device 11 is reduced in pressure below the pressure of input chamber 16 in accordance with an increase in value of the electrical signal of the P-line 35, and thus in accordance with the pressure exerted by the actuator 55 against the movable valve seat 45. This opens valve 14 by venting vent chamber 18 as has been described above so that pressure in pilot valve chamber 18 is reduced relative to the pressure of input chamber 16 in accordance with the degree of energization of the P-line 35. Valve 15 is maintained closed at this time and valve 14 is lapped when the proper fluid pressure is reached in pilot chamber 18. Thus, the relay valve device 11 develops a signal output over passage 24 for the friction brake control apparatus 25 that varies inversely with the energization of the P-line 35, and develops a maximum fluid pressure corresponding to the fluid pressure output of the pressure regulator 34 that is applied to the input chamber 16 when the P-line signal is reduced to zero.

For release of the brakes, when the electro-pneumatic pilot valve device 10 is used in a P-line system, the P-line signal is at its maximum value, which provides a strong enough force to the left on plunger 13 to open valve 14, and, while keeping valve 15 closed, to vent fluid from pilot chamber 18, and thus from the relay valve device 11, for releasing the friction brakes. Pressure remains in chamber 16, but it is prevented from entering pilot chamber 18 by closed valve 15.

It is to be understood that the simplified input and output apparatus that has been illustrated diagrammatically in association with the electro-pneumatic pilot valve device 10 has been chosen to simplify the disclosure of the present invention rather than to limit the number of brake control functions that can be provided. Thus, in practice, the system may be further governed by load control, the speed of the vehicle, hand brake control, and the control of the friction brakes through pneumatic to hydraulic converters and automatic slack adjusters and the like, in accordance with the requirements of practice.

Having thus described an electro-pneumatic pilot valve device as a preferred embodiment of the present invention as used in two different types of braking systems, it is to be understood that various modifications and alterations may be made to the specific embodiment shown without departing from the spirit or scope of the invention.

What is claimed is:

1. A brake control system for governing fluid pressure control of friction brakes of a vehicle, the brake control system having an electro-pneumatic pilot valve device operably connected to a relay valve device for governing fluid pressure control of the friction brakes in accordance with at least one variable analog signal input to the pilot valve device, wherein an improved electro-pneumatic pilot valve device comprises;
    (a) a valve plunger having valves disposed thereon for governing development of a pilot fluid pressure control signal,
    (b) input, vent, and pilot chamber means associated with the valves of the plunger for at times charging the pilot chamber from the input chamber through one of the valves and at other times reducing the pilot pressure through another one of the valves and the vent chamber, (c) linear torque motor means governed by a variable input electrical signal for applying a force axially to the plunger in a direction to open said another valve for reducing pressure in the pilot chamber in accordance with an increase in magnitude of the electrical signal input to the torque motor, (d) self-lapping means for governing axial movement of the plunger to lap said another valve in accordance with a combination of the axial force on the plunger developed by the torque motor and an axial force on the plunger generated by pressure in the pilot chamber substantially balancing an opposing axial force on the plunger generated by pressure in the input chamber, and (e) whereby the improved electro-pneumatic pilot valve device is operable without requiring modification, either as a blending valve device in response to a variable fluid input to the input chamber indicative of a desired degree of braking and an input to the torque motor of an electrical signal variable in accordance with a degree of dynamic braking, or as a control valve device in response to a constant pressure input to the input chamber and a variable electrical input to the torque motor inversely indicative of a desired degree of braking.

2. A brake control system for governing fluid pressure control of friction brakes of a vehicle, the brake control system having an electro-pneumatic pilot valve device operably connected to a relay valve device for governing fluid pressure control of the friction brakes in accordance with at least one variable analog signal input to the pilot valve device, wherein an improved electro-pneumatic pilot valve device comprises;

(a) a valve plunger having coaxially spaced ball valves disposed thereon for governing development of a pilot fluid pressure control signal, (b) input, vent, and pilot chamber means associated with the valves of the plunger for at times charging the pilot chamber from the input chamber through one of the valves and at other times reducing the pilot pressure through another one of the valves and the vent chamber, (c) linear torque motor means governed by a variable input electrical signal for applying a force axially to the plunger in a direction to open said another valve for reducing pressure in the pilot chamber in accordance with an increase in magnitude of the electrical signal input to the torque motor, (d) self-lapping means for governing axial movement of the plunger to lap said another valve in accordance with a combination of the axial force on the plunger developed by the torque motor and an axial force on the plunger generated by pressure in the pilot chamber substantially balancing an opposing axial force on the plunger generated by pressure in the input chamber, and (e) said one valve operating in cooperation with a fixed seat, and said another one of the valve operating in cooperation with a movable seat that is biased toward said another valve by an actuator of the linear torque motor.

3. A brake control system according to claim 2 wherein said one valve is within the vent chamber, and said another valve is within the pilot chamber.

4. A brake control system according to claim 2 wherein a damping piston is disposed between the actuator of the torque motor and the movable valve seat.

5. A brake control system according to claim 4 wherein the damping piston is fluid balanced by fluid from the pilot chamber.

6. A brake control system according to claim 2 wherein the input chamber has differential force generating means for generating said opposing axial force on the plunger in accordance with a fluid pressure input to the input chamber.

7. A brake control system according to claim 6 wherein the differential force generating means comprises diaphragms on opposite sides of the input chamber of different areas for generating said opposing axial force on the plunger in response to fluid pressure input to the input chamber.

8. A brake control system according to claim 7 wherein the force on the plunger generated by pressure in the pilot chamber is applied against said another one of the valves over an area substantially comparable to the difference in areas of the diaphragms of the input chamber.

* * * * *